(12) United States Patent
Kim et al.

(10) Patent No.: US 11,099,411 B2
(45) Date of Patent: Aug. 24, 2021

(54) PRIVACY FILM AND DISPLAY DEVICE INCLUDING THE SAME

(71) Applicant: LG DISPLAY CO., LTD., Seoul (KR)

(72) Inventors: Sooyoun Kim, Paju-si (KR); SeokHo Lee, Paju-si (KR); Seong-Il Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/118,839

(22) Filed: Dec. 11, 2020

(65) Prior Publication Data

US 2021/0181549 A1 Jun. 17, 2021

(30) Foreign Application Priority Data

Dec. 17, 2019 (KR) .................. 10-2019-0169204

(51) Int. Cl.
*G02F 1/13* (2006.01)
*G02F 1/1335* (2006.01)
*G02F 1/1334* (2006.01)

(52) U.S. Cl.
CPC .......... *G02F 1/1323* (2013.01); *G02F 1/1334* (2013.01); *G02F 1/133512* (2013.01); *G02F 2202/28* (2013.01)

(58) Field of Classification Search
CPC .......... G02F 1/1323; G02F 1/1334; G02F 1/133512; G02F 2202/28; G02F 1/133504; G02F 1/133607; G02F 1/133524
See application file for complete search history.

(56) References Cited

U.S. PATENT DOCUMENTS

2008/0080040 A1* 4/2008 Mimura ............... G02B 5/201
359/238
2018/0164615 A1* 6/2018 Yoon ................. G02F 1/1323

FOREIGN PATENT DOCUMENTS

| JP | 2003-287607 A | 10/2003 |
| JP | 2003287607 A | * 10/2003 |
| JP | 2019-196006 A | 11/2019 |
| KR | 10-2003-0048148 A | 6/2003 |
| KR | 10-2007-0058257 A | 6/2007 |
| KR | 10-2008-0031445 A | 4/2008 |
| KR | 10-2019-0053571 A | 5/2019 |

\* cited by examiner

*Primary Examiner* — Jessica M Merlin
(74) *Attorney, Agent, or Firm* — Birch, Stewart, Kolasch & Birch LLP (57) ABSTRACT

The present disclosure relates a privacy film and a display device including the privacy film. More specifically, by including a light collector including a plurality of first light blocking patterns arranged to be spaced apart from one another, an adhesive layer disposed on the light collector and having at least one first groove in at least a part overlapping the plurality of first light blocking patterns, and a light diffuser disposed on the adhesive layer and including a plurality of capsules, the privacy film and the display device including the privacy film can prevent light discharge efficiency of the privacy film from being degraded and be easily reworked.

18 Claims, 10 Drawing Sheets

PRIVACY FILM AND DISPLAY DEVICE INCLUDING THE SAME

CROSS-REFERENCE TO RELATED APPLICATION

This application claims the priority benefit of Korean Patent Application No. 10-2019-0169204, filed on Dec. 17, 2019 in the Korean Intellectual Property Office, the entire contents of which are hereby expressly incorporated by reference into the present application.

BACKGROUND

1. Technical Field

The present disclosure relates to a privacy film and a display device including the privacy film.

2. Description of the Related Art

Display devices are typically widely used as display screens of various products, such as televisions, notebook computers, monitors, and ATMs (automated teller machines) in banks, as well as mobile communication terminals, electronic notebooks, e-books, portable multimedia players (PMPs), navigation devices, ultra mobile PCs (UMPCs), cellular telephones, smart phones, tablet computers, watch phones, and the like.

The display devices serve to display information desired by a user as video images, and are usually designed to have a wide viewing angle for enabling the user to view the images from various angles. However, according to products having the display device, in case some products having the display device are configured with the wide viewing angle, there is a possibility that characteristics of such products can be adversely affected. In some instances, the user can desire to view images at a narrow viewing angle.

For example, in the case of the ATM used in banks, when a user inputs personal information, it is required to prevent other people from viewing that personal information. It is therefore preferable that the viewing angle of the associated display device is narrower.

For another example, in the case of navigation of a vehicle, in case the viewing angle of an upper portion or a lower portion of an associated display device is wide, images displayed on the display device can degrade a driver's concentration and interfere with driving. Moreover, when driving at night, the images displayed on the display device can be reflected from the windshield of the vehicle, and lead to adversely affecting the safety of the driver.

Thus, display devices are usually manufactured to have a wide viewing angle, but it can be desirable to have a narrow viewing angle depending on products having the display devices.

SUMMARY OF THE INVENTION

It is one object of the present disclosure to provide a privacy film capable of easily being reworked and a display device including the privacy film, by providing an adhesive layer with at least one groove between a light collector and a light diffuser.

It is another object of the present disclosure to provide a privacy film preventing light discharge efficiency of the privacy film from being degraded and a display device including the privacy film, by locating at least one groove of an adhesive layer in an area corresponding to a light blocking pattern.

It is further another object of the present disclosure to provide a privacy film with a reduced thickness and a display device including the privacy film, by providing an adhesive layer served as an upper substrate of a light collector.

In accordance with one aspect of the present disclosure, provided are a privacy film including: a light collector including a plurality of first light blocking patterns arranged to be spaced apart from one another, an adhesive layer disposed on the light collector and having at least one first groove in at least a part overlapping with the plurality of first light blocking patterns, and a light diffuser disposed on the adhesive layer and including a plurality of capsules; and a display device including the privacy film.

In accordance with another aspect of the present disclosure, a display device is provided that includes a display panel, a backlight unit located under the display panel, and a privacy film located between the display panel and the backlight unit, the privacy film including: a light collector including a plurality of first light blocking patterns arranged to be spaced apart from one another, an adhesive layer disposed on the light collector and having at least one first groove in at least a part overlapping the plurality of first light blocking patterns, and a light diffuser disposed on the adhesive layer and including a plurality of capsules.

In accordance with embodiments of the present disclosure, it is possible to provide a privacy film capable of easily being reworked and a display device including the privacy film, by providing an adhesive layer with at least one groove between a light collector and a light diffuser.

Further, in accordance with embodiments of the present disclosure, it is possible to provide a privacy film preventing light discharge efficiency of the privacy film from being degraded and a display device including the privacy film, by locating at least one groove of an adhesive layer in an area corresponding to a light blocking pattern.

Further, in accordance with embodiments of the present disclosure, it is possible to provide a privacy film with a reduced thickness and a display device including the privacy film, by providing an adhesive layer served as an upper substrate of a light collector.

DETAILED DESCRIPTION OF THE EMBODIMENTS

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description can make the subject matter in some embodiments of the present invention rather unclear. The terms such as "including", "having", "containing", "constituting," "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(a)", or "(b)" can be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "can" fully encompasses all the meanings of the term "can".

Hereinafter, exemplary embodiments of the present disclosure will be described in detail with reference to the accompanying drawings.

Figure 1:
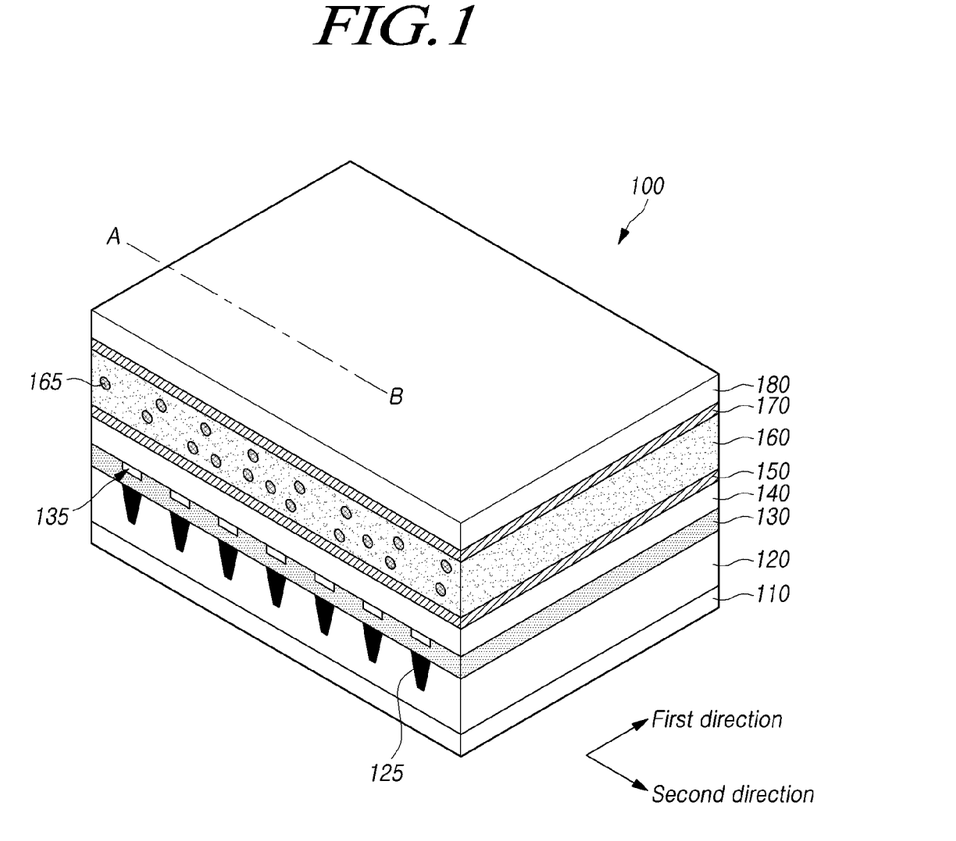
FIG. 1 is a perspective view illustrating a privacy film according to embodiments of the present disclosure.
Figure 2:
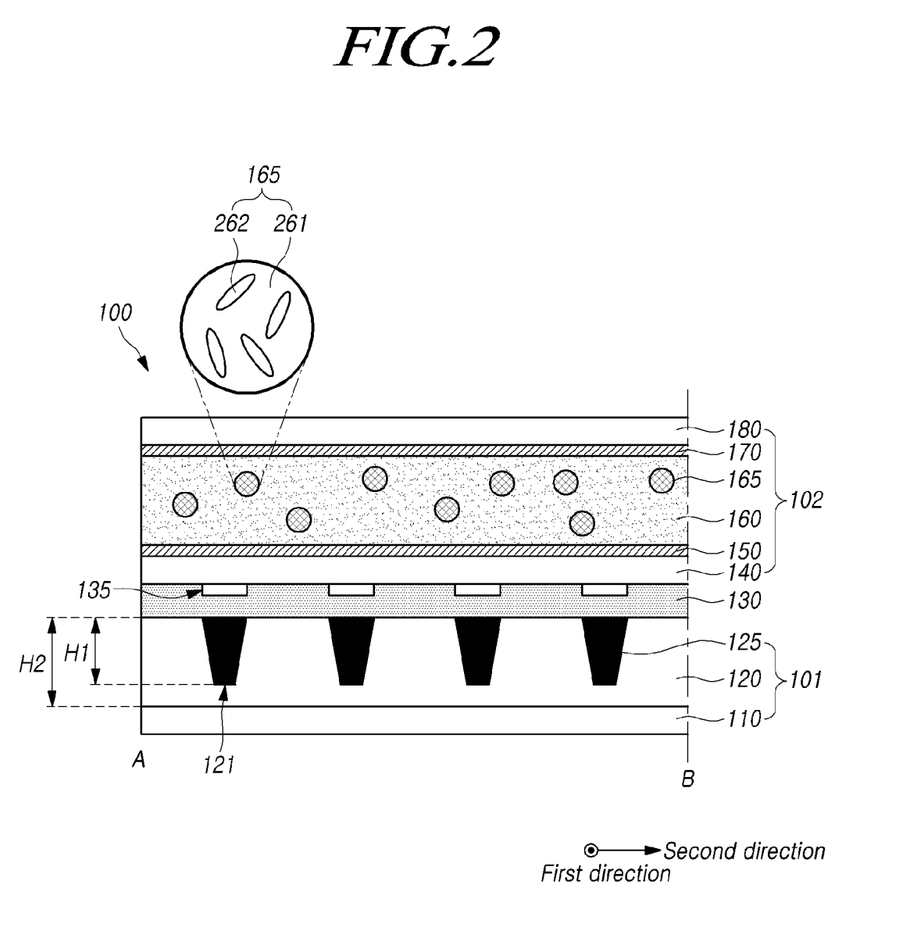
FIG. 2 is a cross-sectional view taken along line A-B of FIG. 1.

FIG. 1 is a perspective view illustrating a privacy film according to embodiments of the present disclosure. FIG. 2 is a cross-sectional view taken along line A-B of FIG. 1.

Figure 3:
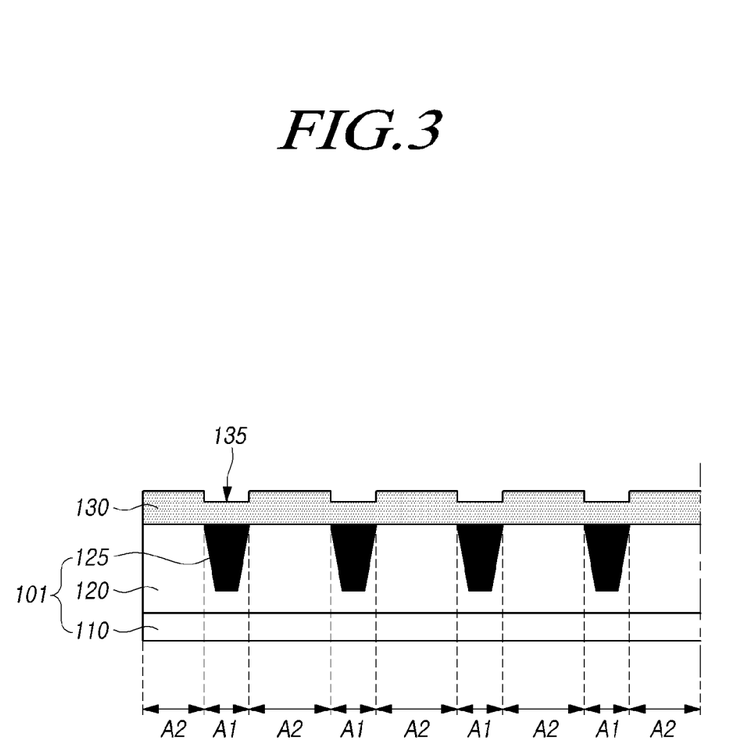
FIG. 3 illustrates a structure of a light collector and an adhesive layer according to an embodiment of the present disclosure.
Figure 4:
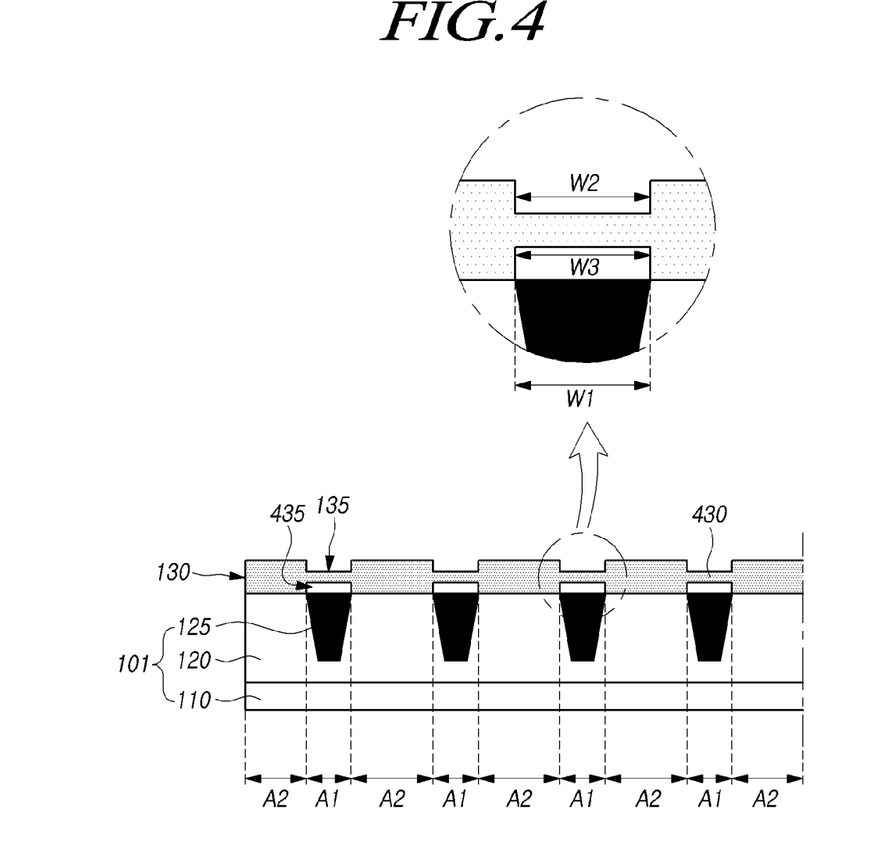
FIG. 4 illustrates a structure of a light collector and an adhesive layer according to another embodiment of the present disclosure.

FIG. 3 illustrates a structure of a light collector and an adhesive layer according to an embodiment of the present disclosure. FIG. 4 illustrates a structure of a light collector and an adhesive layer according to another embodiment of the present disclosure. All components of the privacy film and a display device including the privacy film are operatively coupled and configured.

A privacy film 100 according to the embodiments of the present disclosure can be a film that becomes transparent or opaque depending on whether a voltage is applied. For example, the privacy film 100 can be in a transparent state (a privacy mode, or a narrow viewing angle mode) when a voltage is applied to the privacy film 100, and the privacy film 100 can be in an opaque state (a normal mode) when a voltage is not applied to the privacy film 100. Here, the opaque state can include a state in which the privacy film 100 becomes blurred.

Referring to FIGS. 1 and 2, the privacy film 100 according to the embodiments of the present disclosure includes a light collector 101, an adhesive layer 130 and a light diffuser 102.

The light collector 101 includes a first substrate 110 and a first light collecting layer 120 disposed on the first substrate 110.

The first substrate 110 can include a material with high light transmittance.

For example, the first substrate 110 can include at least one of polyimide (PI), cyclic olefin polymer (COP), polycabonate (PC), polyethyleneterephthalate (PET), polyethylenapthanate (PEN), polynorborneen (PNB) and polyethersulfone (PES); however, embodiments of the present disclosure are not limited thereto.

The first light collecting layer 120 can include an organic material with high light transmittance. Further, the first light collecting layer 120 can include an organic material capable of allowing processes for forming a first accommodator 121 to be performed (e.g., a patterning process or an ultraviolet curing process).

For example, the first light collecting layer 120 can include one or more resins selected from a group including an acrylic resin, an acrylate resin, a urethane resin, an epoxy resin, a polyester resin, and a phenol resin; however, embodiments of the present disclosure are not limited thereto.

A plurality of first light blocking patterns 125 can be disposed in the first light collecting layer 120.

Specifically, the first light collecting layer 120 can include a plurality of first accommodators 121 spaced apart from one another.

The plurality of first accommodators 121 can be grooves, and can be formed in one or more area(s) of the first light collecting layer 120.

One first light blocking pattern 125 can be disposed in one first accommodator 121.

The plurality of first light blocking patterns 125 can be an element for controlling a viewing angle by limiting a traveling path of incident light.

For example, the plurality of first light blocking patterns 125 can serve to reduce the viewing angle by blocking light incident in a direction inclined at a certain angle to the first light collecting layer 120. In other words, the viewing angle can be controlled by passing light in a direction perpendicular to a direction (corresponding to a second direction in FIGS. 1 and 2) parallel to a width of the plurality of first light blocking patterns 125, and blocking light incident in a direction inclined to the width of the plurality of first light blocking patterns 125 (e.g., a direction intersecting the direction parallel to the width of the plurality of first light blocking patterns 125).

The width of the plurality of first light blocking patterns 125 can have a maximum length in a direction perpendicular to a direction in which the first substrate 110 and the first light collecting layer 120 are stacked.

The plurality of first light blocking patterns 125 can include an organic material capable of blocking light incident in the inclined direction. For example, the plurality of first light blocking patterns 125 can include a colored organic material such as black carbon etc.; however, embodiments of the present disclosure are not limited thereto.

In one example, the plurality of first light blocking patterns 125 can be disposed to be spaced apart from one another in order easily to block at least part of light incident to the first light blocking patterns 125.

An adhesive layer 130 can be disposed on the plurality of first light blocking patterns 125 and the first light collecting layer 120, and contact one surface of the first light collecting layer 120 and one surface of one or more of the plurality of first light blocking patterns 125.

A width of the one surface of the plurality of first light blocking patterns 125 contacting the adhesive layer 130 can be greater than a width of an opposite surface of the plurality of first light blocking patterns 125 from the adhesive layer 130, and thus, the plurality of first light blocking patterns 125 can have a trapezoidal cross section; however, embodiments of the present disclosure are not limited thereto. For example, a cross-sectional shape of the plurality of first light blocking patterns 125 can be circular or polygonal.

The plurality of first light blocking patterns 125 can be formed by a printing process or a patterning process.

For example, the printing process can include a method of roll printing, screen printing, gravure printing, gravure-offset printing, or flexo printing, which is known in the art; however, embodiments of the present disclosure are not limited thereto.

As described above, the plurality of first accommodators 121 can be grooves formed on the first light collecting layer 120, and be provided in a direction facing the first substrate 110 from the adhesive layer 130 disposed on the first light collecting layer 120.

In one example, a height H1 of the first accommodator 121 can be smaller than a height H2 of the first light collecting layer 120. In another embodiment, a height of the first light blocking pattern 125 located in the first accommodator 121 can correspond to the height H1 of the first accommodator 121.

In a case where the height H1 of the first accommodator 121 and the height H2 of the first light collecting layer 120 correspond to each other, when forming the first light blocking pattern 125 to be located in the first accommodator 121, the height of the first light blocking pattern 125 can be formed to be larger than the height H2 of the first light collecting layer 120 due to a process margin.

When the height of the first light blocking pattern 125 is formed to be larger than the height H2 of the first light collecting layer 120, a gap can be present between the first light collecting layer 120 and the first substrate 110 by the first light blocking patterns 125, and as a result, an air layer can be formed in the gap. Meanwhile, since the refractive index of air is smaller that of the first substrate 110, light incident from the outside of the light collector 101 to the first substrate 110 can be trapped inside of the light collector 101 and may not be therefore extracted. As a result, there is a possibility that luminous efficiency of the privacy film 100 can be degraded.

Here, the height H2 of the first light collecting layer 120 can be 15 μm to 40 μm. The first light collecting layer 120 can have the height H2 of 15 μm to 40 μm; therefore, a sufficient tolerance can be secured to form the first accommodator 121 and the first light blocking pattern 125.

At least one layer of adhesive layer 130 can be formed on the light collector 101 including the first substrate 110, the first light collecting layer 120 and the light blocking patterns 125.

The adhesive layer 130 can serve to combine the light collector 101 and a light diffuser 102, and be also served as an upper substrate of the light collector 101. The privacy film 100 according to embodiments of the present disclosure has an effect of reducing a thickness thereof by providing the adhesive layer 130 between the light collector 101 and the light diffuser 102.

The adhesive layer 130 can include an acrylic-based, silicone-based or urethane-based high transmissive resin with high light transmittance.

For example, the adhesive layer 130 can an optical adhesive film (an optically clear adhesive OCA) of a transparent double-sided tape type, or an optical adhesive resin (an optically clear resin OCR) of a transparent liquid type. The optically clearing of the optical adhesive film and the optical adhesive resin can mean that a transmittance of the material is 90% or more.

As shown in FIGS. 1 to 3, at least one first groove 135 can be formed in the adhesive layer 130. The at least one groove 135 can be formed by patterning using ultraviolet light or using a photolithography process; however, embodiments of the present disclosure are not limited thereto.

Specifically, the adhesive layer 130 can have at least one first groove 135 in at least a part overlapping with the first light blocking patterns 125.

The light diffuser 102 can be disposed on the adhesive layer 130.

In one example, the first groove 135 can be formed on an upper portion of the adhesive layer 130 contacting a second substrate 140 of the light diffuser 102. An air layer can be located in the first groove 135.

The adhesive layer 130 can serve to bond the light collector 101 and the light diffuser 102. However, in case a bonding location is not rightly located or impurities are inserted, due to the incorrectly selected bonding location, optical characteristics of the privacy film 100 can be deteriorated. In this case, a reworking process can be performed such that after separating the light collector 101 and the light diffuser 102, the light collector 101 and the light diffuser 102 are bonded using a new adhesive layer 130.

When the reworking process is performed, there can occur some problems that the light collector 101 and the light diffuser 102 are not easily peeled from the adhesive layer 130, or at least one film (101, 102) is torn and cannot be therefore reused.

In the privacy film 100 according to embodiments of the present disclosure, since the first groove 135 with an air layer is located in the adhesive layer 130, the adhesive layer 130 can include portions with different adhesive strengths.

Specifically, since the adhesive layer 130 contacts only the light collector 101 in an area in which the first groove 135 is provided, an adhesive strength between the light diffuser 102 and the adhesive layer 130 can be weaker than an adhesive strength between the light collector 101 and the adhesive layer 130.

In other words, since the adhesive strength between the light diffuser 102 and the adhesive layer 130 is relatively weaker due to the first groove 130 provided in the adhesive layer 130, the light diffuser 102 can be relatively easily peeled from the adhesive layer 130, and be prevented from being defected when the peeling is performed.

Meanwhile, the structure of the adhesive layer 130 of the privacy film 100 according to embodiments of the present disclosure are not limited thereto.

Referring to FIG. 4, the adhesive layer 130 can include at least second groove 435 overlapping with the first groove 135. Here, the first groove 135 and the second groove 435 can overlapped with each other in the direction in which the first substrate 110 and the first light collecting layer 120 are stacked. For example, the second groove 435 can be disposed under the first groove 135.

In another example, the adhesive layer 130 can further include a connection portion 430 disposed between the first groove 135 and the second groove 435. The connection portion 430 can serve to prevent the adhesive layer 130 from being separated from an area in which the first and second grooves 135 and 435 are disposed.

Meanwhile, the second groove 435 can serve to weaken an adhesive strength between the light collector 101 and the adhesive layer 130, allow the light collector 101 to be easily peeled from the adhesive layer 130, and thus, prevent the light collector 101 from being defected when the peeling is performed.

As described above, the first groove 135 can be disposed in an area overlapping with the first light blocking patterns 125 provided in the light collector 101.

Meanwhile, in the privacy film 100 according to embodiments of the present disclosure, light can be incident from a rear surface of the first substrate 110.

Here, light incident to the first light blocking patterns 125 can be absorbed by the first light blocking patterns 125. The plurality of first light blocking patterns 125 can mainly absorb light incident in a direction intersecting a direction in which the light collector 101 and the adhesive layer 130 are stacked.

Thus, since light incident to the first substrate 110 cannot be transmitted in an area overlapping with the plurality of first light blocking patterns 125, the light incident to the first substrate 110 may not be traveled to the light diffuser 102.

Accordingly, as shown in FIG. 3, an area in which at least one first light blocking pattern 125 is disposed can be an absorbing area A1 that absorbs light. In one example, a width of the absorbing area A1 of the privacy film 100 can correspond to the maximum width W1 of the first light blocking pattern 125.

Meanwhile, the width of the absorbing area A1 and the maximum width of the first light blocking pattern 125 can be a maximum length in a direction perpendicular to the direction in which the first substrate 110 and the first light collecting layer 120 are stacked.

The absorbing area A1 of the privacy film 100 can be an area in which light cannot be transmitted.

An area in which at least one first light blocking pattern 125 is not disposed can be a transmitting area A2 of the privacy film 100. The transmitting area A2 of the privacy film 100 can be an area in which the light incident to the first substrate 110 transmits.

In other words, the light collector 101 of the privacy film 100 can include at least one absorbing area A1 and at least one transmitting area A2. In case a plurality of first light blocking patterns 125 is disposed in the light collector 101, the light collector 101 can include a plurality of absorbing areas A1 and a plurality of transmitting areas A2.

Meanwhile, since the plurality of first light blocking patterns 125 are disposed to be spaced apart from one another, the absorbing areas A1 and the transmitting areas A2 can be alternately disposed.

A ratio of one or more absorbing area(s) to one or more transmitting area(s) of the light collector 101, that is, the one or more absorbing area(s) of the light collector 101 vs. the one or more transmitting area(s) of the light collector 101, can be 1:3 to 1:3.8. Thus, since the light collector 101 includes one or more absorbing area(s) A1 and one or more transmitting area(s) A2, it is possible to adjust viewing angles across the entire area of the light collector 101.

As shown in FIG. 3, a width W2 of the first groove 135 located in the adhesive layer 130 can correspond to the maximum width W1 of the first light blocking pattern 125. However, embodiments of the present disclosure are not limited thereto; for example, the width W2 of the first groove 135 can be smaller than the maximum width W1 of the first light blocking pattern 125.

When the width W2 of the first groove 135 is greater than the maximum width W1 of the first light blocking pattern 125, at least a part of the first groove 135 can overlap with the transmitting area A2 of the privacy film 100. As described above, the air layer can be located in the first groove 135, and light reaching the air layer located in the first groove 135 among light having transmitting the first light collecting layer 120 can be reflected due to a lower refractive index of the air layer and thus trapped without further traveling to the light diffuser 102. As a result, there is a possibility that luminous efficiency of the privacy film 100 can be degraded.

Further, as shown in FIG. 4, a width W2 of the first groove 135 and a width W3 of the second groove 435 which are located in the adhesive layer 130, and a maximum width W1 of the first light blocking pattern 125 can correspond to one another. Here, the width W2 of the first groove 135 and the width W3 of the second groove 435 can be maximum lengths in a direction perpendicular to the direction in which the first substrate 110 and the first light collecting layer 120 are stacked.

Further, as shown in FIG. 4, the width W2 of the first groove 135 and the width W3 of the second groove 435 which are located in the adhesive layer 130 can be smaller than the maximum width W1 of the first light blocking pattern 125. Further, the width W2 of the first groove 135 and the width W3 of the second groove 435 can be different, and in this case, the width W2 of the first groove 135 and the width W3 of the second groove 435 can be smaller than the maximum width W1 of the first light blocking pattern 125.

Thus, since the width W2 of the first groove 135 and the width W3 of the second groove 435 are smaller than the maximum width W1 of the first light blocking pattern 125, it is possible to provide an effect of easily reworking the light collector 101 and the light diffuser 102 without reducing the luminous efficiency of the privacy film 100.

The light diffuser 102 disposed on the adhesive layer 130 can include a light diffusing layer 160 including a second substrate 140, a first electrode 150, and a plurality of capsules 165, a second electrode 170 and a third substrate 180.

Referring to FIGS. 2 and 3, the second substrate 140 of the light diffuser 102 can be disposed on the adhesive layer 130.

The first electrode 150 can be disposed on the second substrate 140.

The light diffusing layer 160 including the plurality of capsules 165 can be disposed on the first electrode 150.

The second electrode 170 can be disposed on the light diffusing layer 160.

The third substrate 180 can be disposed on the second substrate 170.

Here, the second substrate 140 and the third substrate 180 can include a material with high light transmittance.

For example, the second substrate 140 and the third substrate 180 can include at least one of polyimide (PI), cyclic olefin polymer (COP), polycabonate (PC), polyethyleneterephthalate (PET), polyethylenapthanate (PEN), polynorborneen (PNB) and polyethersulfone (PES); however, embodiments of the present disclosure are not limited thereto. Further, the second substrate 140 and the third substrate 180 can include one or material(s) being corresponded to each other or different materials.

Here, the first electrode 150 and the second electrode 170 can include a conductive material with high light transmittance.

For example, the first electrode 150 and the second electrode 170 can include a transparent conductive material. Here, the transparent conductive material can include at least one of indium tin oxide (ITO), indium zinc oxide (IZO), indium tin zinc oxide (ITZO), fluorine tin oxide FTO, aluminum zinc oxide (AZO) or antimony tin oxide (ATO); however, embodiments of the present disclosure are not limited thereto. The first substrate 150 and the second substrate 170 can include one or material(s) being corresponded to each other or different materials.

The plurality of capsules 165 located in the light diffusing layer 160 can serve to scatter or transmit light depending on whether a voltage is applied to the privacy film 100.

For example, when a voltage is applied to the privacy film 100, light having transmitted the light collector 101, the adhesive layer 130, the second substrate 140 and the first electrode 150 of the light diffuser 102 can pass through the light diffusing layer 160 and then exit through the third substrate 180.

When a voltage is not applied to the privacy film 100, the light having transmitted the light collector 101, the adhesive layer 130, the second substrate 140 and the first electrode 150 of the light diffuser 102 can be scattered by the plurality of capsules dispersed on the light diffusing layer 160 and some of the light may not exit through the third substrate 180 and the other light can exit through the third substrate 180. The light having exited through the third substrate 180 travels in various angles; therefore, resulting in a wide viewing angle.

The plurality of capsules 165 can include a matrix (or a substrate) 261 and a plurality of particles 262 included in the matrix 261.

Here, at least one particle 262 can be a molecule with an anisotropic permittivity and an anisotropic refractive index. For example, the at least one particle 262 can be polymer dispersed liquid crystal PDLC; however, types of particles according to embodiments of the present disclosure are not limited thereto.

Since the at least one particle 262 has the anisotropic permittivity and the anisotropic refractive index, when a voltage is applied to the privacy film 100 and when a voltage is not applied to the privacy film 100, that is, when a voltage is applied to at least one particle 262 and when a voltage is not applied to at least one particle 262, the particles can have different permittivities and refractive indexes.

When a voltage is not applied to the privacy film 100, as shown in FIG. 2, the plurality of particles 262 can be irregularly present in the matrix 261.

Further, when a voltage is not applied to the privacy film 100, a refractive index of at least one particle 262 and a refractive index of the matrix 261 can be different.

In other words, a difference in refractive indexes of the matrix 261 of the capsule 165 and the at least one particle 262 can occur, leading light incident to the capsule 165 to be scattered in an interface of the matrix 261 and the at least one particle 262.

Here, since light incident to the privacy film 100 is scattered by the plurality of particles 262 and cannot exit through the third substrate 180, the privacy film 100 can be in an opaque state (a normal mode).

Meanwhile, when a voltage is applied to the privacy film 100, the plurality of particles 262 can be arranged in a constant direction in the matrix 261.

Further, when a voltage is applied to the privacy film 100, a refractive index of the at least one particle 262 and a refractive index of the matrix 261 can correspond to each other. Accordingly, light incident to the capsule 165 is not scattered in an interface of the matrix 261 and the at least one particle 262 and can exit through the third substrate 180 (a privacy mode)

In the resin included in the light diffusing layer 160, a content of the plurality of particles 262 can be 30 to 70%.

In case the content of the plurality of particles 262 is less than 30% in the resin included in the light diffusing layer 160, when a voltage is not applied (in an off-state) to the privacy film 100, an amount of light incident to the privacy film 100 scattered by the plurality of particles 262 can be reduced; therefore, the privacy film may not become opaque in the off-state. In this case, side viewing angle characteristics of the privacy film 100 can be degraded.

Further. in case the content of the plurality of particles 262 is more than 70% in the resin included in the light diffusing layer 160, when a voltage is applied (in an on-state) to the privacy film 100, an amount of light incident to the privacy film 100 scattered by the plurality of particles 262 can be too much increased; therefore, the privacy film may not become transparent in the on-state.

A thickness of the light diffusing layer 160 can be 15 μm to 25 μm. Since the light diffusing layer 160 has the thickness of 15 μm to 25 μm, an appropriate amount of capsules 165 can be dispersed in the light diffusing layer 160. Meanwhile, such a thickness of the light diffusing layer 160 is merely one example; therefore, embodiments of the present disclosure are not limited thereto.

Hereinafter, discussions will be given on the normal mode and the privacy mode of the privacy film according to embodiments of the present disclosure in detail with reference to FIGS. 5 and 6.

Figure 5:
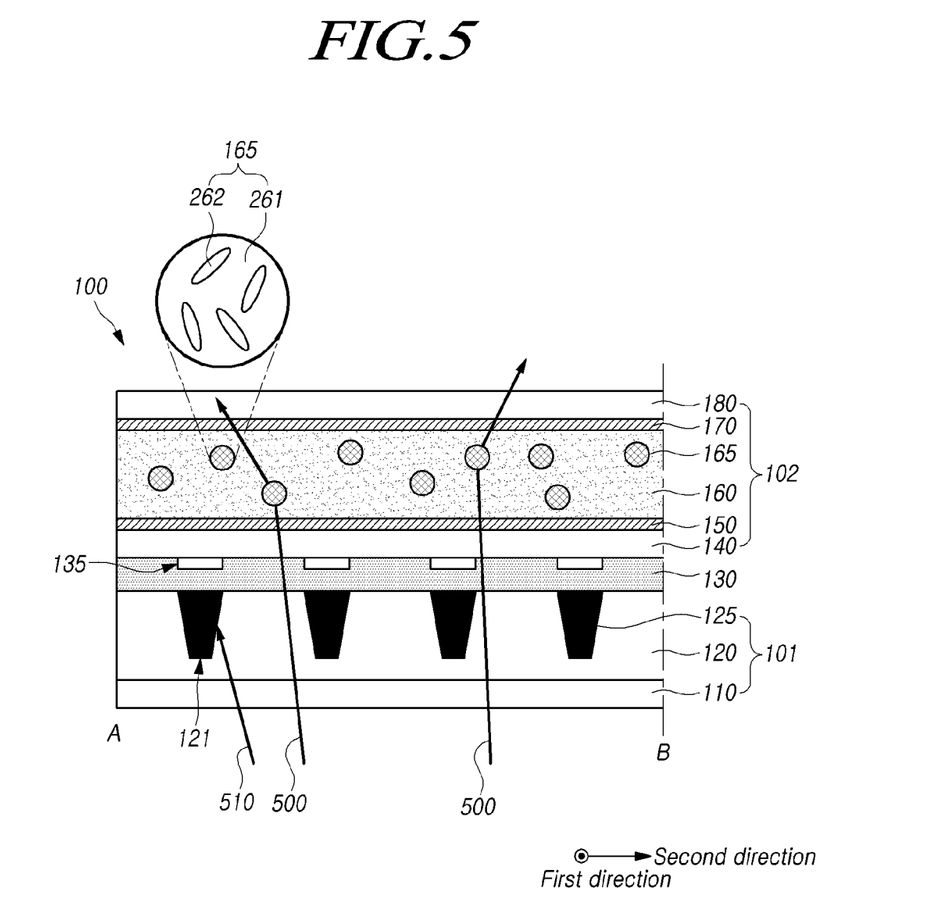
FIG. 5 illustrates a normal mode of a privacy film according to embodiments of the present disclosure.

FIG. 5 illustrates a normal mode of a privacy film according to embodiments of the present disclosure. FIG. 6 illustrates a privacy mode of the privacy film according to embodiments of the present disclosure.

In the following description, some configurations, effects, etc. of the embodiments or examples discussed above may not be repeatedly described for convenience of description.

Referring to FIG. 5, when the privacy film 100 according to embodiments of the present disclosure is in the off-state, i.e., to which a voltage is not applied, the plurality of particles 262 in the plurality of capsules 165 included in the light diffusing layer 160 can be in an irregular arrangement state.

Further, when a voltage is not applied to the privacy film 100, a refractive index of the plurality of particles 262 and a refractive index of the matrix 261 of the capsule 165 can be different. For example, a difference in refractive indexes of the plurality of particles 262 and the matrix 261 can be 0.1 to 0.3; however, embodiments of the present disclosure are not limited thereto.

Due to a difference in refractive indexes of the plurality of particles 262 and the matrix 261, light 500 incident to the light diffusing layer 160 passing through the first substrate 110 and the first electrode 150 can be scattered in an interface between at least one particle 262 and the matrix 261, and can be trapped in the privacy film 100 without exiting through the third substrate 180.

Further, some of light 500 incident to the light diffusing layer 160 after having passed through the first substrate 110 and the first electrode 150 can transmit the light diffusing layer 160 and the second electrode 170 and exit through the third substrate 180.

At this time, an amount of light scattered by the plurality of capsules 165 can be larger than an amount of light transmitting the light diffusing layer 160.

In this case, the privacy film 100 can be in an opaque state (or a blurred state).

Meanwhile, light 500 incident to the light diffusing layer 160 after having passed through the first substrate 110 and the first electrode 150 can be light that is not absorbed by the first light blocking patterns 125.

Further, light 510 incident to the first light blocking patterns 125 can be absorbed by the first light blocking patterns 125. In particular, the plurality of first light blocking patterns 125 can absorb light incident in a direction intersecting a direction in which the light collector 101 and the adhesive layer 130 are stacked.

Thus, the first light blocking patterns 125 can absorb light 510 that deteriorates viewing angle characteristics.

Figure 6:
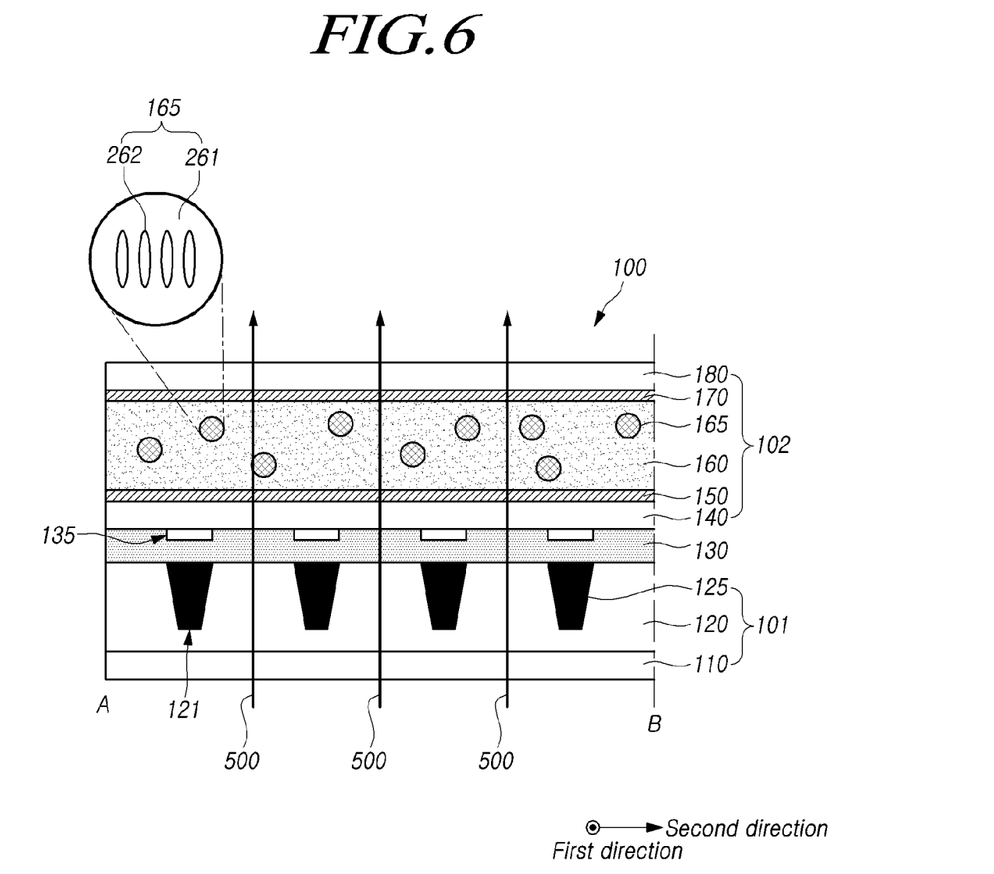
FIG. 6 illustrates a privacy mode of the privacy film according to embodiments of the present disclosure.

Referring to FIG. 6, when the privacy film 100 according to embodiments of the present disclosure is in the on-state, i.e., to which a voltage is applied, the plurality of particles 262 in the plurality of capsules 165 included in the light diffusing layer 160 can be arranged in a constant direction.

Voltage of 20V to 60 V can be applied to the privacy film 100. However, this range of voltages is merely an exemplary range; thus, embodiments of the present disclosure are not limited thereto.

Further, when a voltage is applied to the privacy film 100, a refractive index of the plurality of particles 262 and a refractive index of the matrix 261 of the capsule 165 can correspond to each other.

Since the refractive index of the plurality of particles 262 and the refractive index of the matrix 261 correspond to each other, light 500 incident to the light diffusing layer 160 after having passed through the first substrate 110 and the first electrode 150 can transmit the plurality of capsules 165 and the light diffusing layer 160, transmit the second electrode 170, and then, exit through the third substrate 180.

It should be understood that embodiments of the present disclosure are not limited thereto, and when a voltage is applied to the privacy film 100, in case a difference in refractive indexes of the plurality of particles 262 and the matrix 261 is smaller than a difference in refractive indexes of the plurality of particles 262 and the matrix 261 when a voltage is not applied to the privacy film 100, an implementation related to this instance can be included within the scope of the present disclosure.

At this time, an amount of light scattered by the plurality of capsules 165 can be significantly smaller than an amount of light transmitting the light diffusing layer 160.

In this case, the privacy film 100 can be in a transparent state (the privacy mode).

The light exiting the privacy film 100 can be light in a direction corresponding to a direction in which the light collector 101, the adhesive layer 130 and the light diffuser 102 are stacked.

Thus, when the privacy film 100 according to embodiments of the present disclosure is in the privacy mode, there is an effect of enabling a direction of the light exiting the privacy film 100 to be adjusted.

Meanwhile, in FIGS. 1 to 6, the light collector 101 has been discussed as including the first substrate 110, the first light collecting layer 120 and the first light blocking patterns 125; however, embodiments of the present disclosure are not limited thereto.

Figure 7:
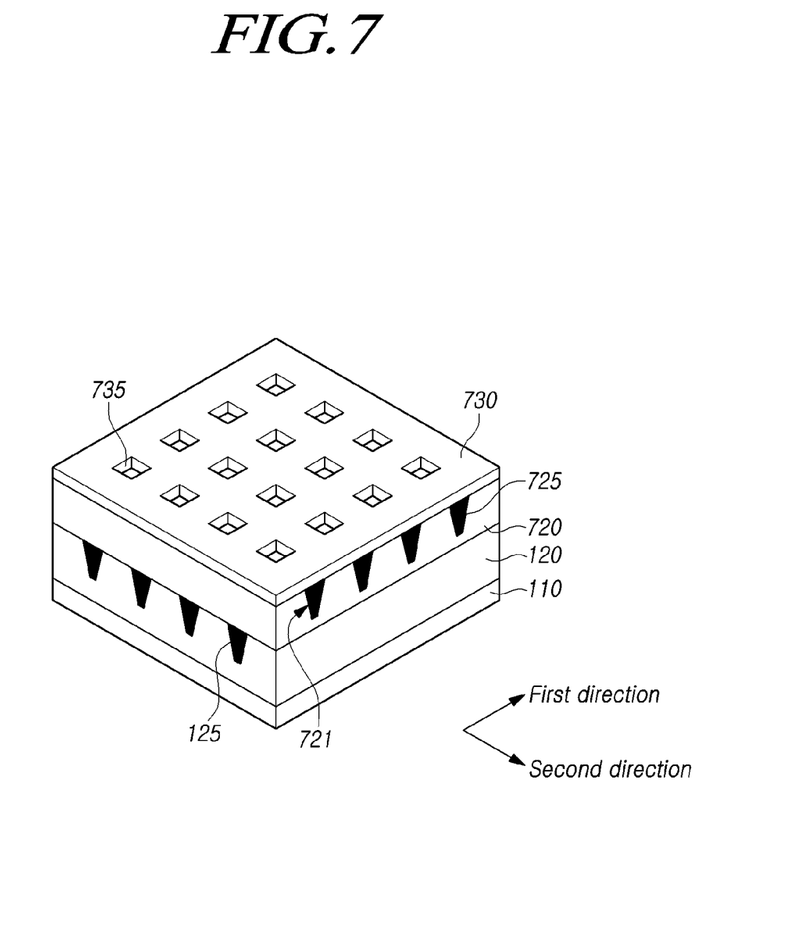
FIG. 7 illustrates a structure of a light collector and an adhesive layer according to further another embodiment of the present disclosure.

For example, as shown in FIG. 7, the light collector can further include a second light collecting layer 720 disposed on the first light collecting layer 120.

FIG. 7 illustrates a structure of a light collector and an adhesive layer according to further another embodiment of the present disclosure.

In the following description, some configurations, effects, etc. of the embodiments or examples discussed above may not be repeatedly described for convenience of description.

Referring to FIG. 7, a light collector according to embodiments of the present disclosure can include a substrate 120, a first light collecting layer 120, and a second light collecting layer 720.

The second light collecting layer 720 can be disposed on the first light collecting layer 120, and an adhesive layer 730 can be disposed on the second light collecting layer 720.

A plurality of second light blocking patterns 725 can be disposed in the second light collecting layer 720. Specifically, the second light collecting layer 720 can include a plurality of second accommodators 721 spaced apart from one another. The plurality of second accommodators 721 can be grooves, and can be formed in one or more area(s) of the second light collecting layer 720.

One second light blocking pattern 725 can be disposed in one second accommodator 721.

Meanwhile, as illustrated in FIG. 7, a plurality of first light blocking patterns 125 can extend in a direction corresponding to a first direction, and the second light blocking patterns 725 can extend in a direction corresponding to a second direction intersecting the first direction.

In other words, the plurality of first accommodators 121 and the plurality of second accommodators 721 are disposed to intersect each other, and the plurality of first light blocking patterns 125 located in the plurality of first accommodators 121 and the plurality of second light blocking patterns 725 located in the plurality of second accommodators 721 are disposed to intersect each other.

One of the first light collecting layer 120 including the plurality of first light blocking patterns 125 and the second light collecting layer 720 including the plurality of second light blocking patterns 725 can adjust left and/or right viewing angles of the privacy film 100, and the other can adjust top and/or bottom viewing angles of the privacy film 100.

For example, the first light collecting layer 120 can adjust the left and/or right viewing angles of the privacy fifth 100, and the second light collecting layer 720 can adjust the top and/or bottom viewing angles of the privacy fifth 100.

A viewing angle adjusting direction of the first and second light collecting layers 120 and 720 can be determined depending on a cross-sectional arrangement direction of the plurality of light blocking patterns included in each of the first light collecting layer 120 and the second light collecting layer 720. Specifically, when a cross section of the plurality of light blocking patterns is arranged in a first direction, the top and/or bottom viewing angles can be adjusted, and when a cross section of the plurality of light blocking patterns is arranged in a second direction, the left and/or right viewing angles can be adjusted.

In the privacy film 100 according to embodiments of the present disclosure, an arrangement of the plurality of light blocking patterns can be variously adjusted according to viewing angle directions needed to be adjusted.

As illustrated in FIG. 7, a plurality of first grooves 735 can be formed in the adhesive layer 730 disposed on the second light collecting layer 720.

At this time, at least one of the first grooves 735 can be located in at least one of areas in which the first light blocking patterns 125 and the second light blocking pattern 725 intersect.

Since the plurality of first grooves 735 is provided in the adhesive layer 730, the peeling of a light diffuser disposed on the adhesive layer 730 can be easily performed.

Further, a structure of the adhesive layer 730 is not limited to the structure of FIG. 7, and similar to FIG. 4, a plurality of second grooves overlapping with the first grooves 735 can be formed under the plurality of first grooves 735. Through this, the peeling of the light collector disposed under the adhesive layer 730 can be easily performed.

The privacy film according to embodiments of the present disclosure can be used alone, such as a smart window.

Further, the privacy film according to embodiments of the present disclosure can be applied to a display device.

Such a structure is further discussed with reference to FIG. 8.

Figure 8:
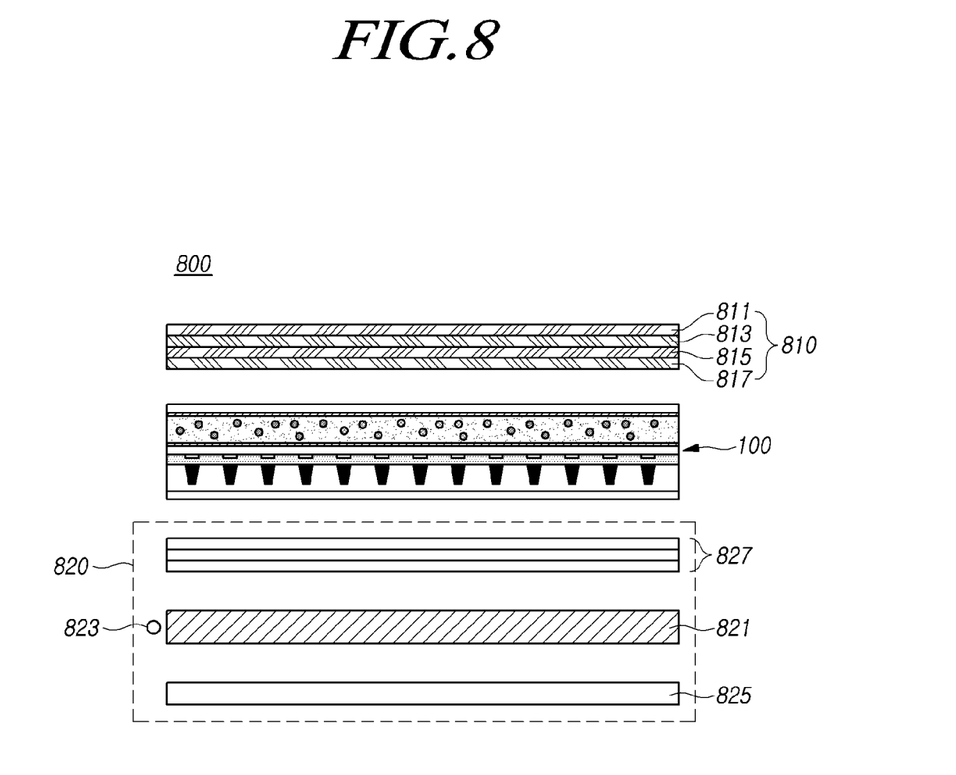
FIG. 8 illustrates a display device including the privacy film according to embodiments of the present disclosure.

FIG. 8 illustrates a display device including a privacy film according to embodiments of the present disclosure.

In the following description, some configurations, effects, etc. of the embodiments or examples discussed above may not be repeatedly described for convenience of description.

Referring to FIG. 8, a display device 800 according to embodiments of the present disclosure can include a display panel 810, a privacy film 100, and a backlight unit 820.

Specifically, the display device 800 includes the display panel 810, the privacy film 100 disposed under the display panel 810, and the backlight unit 820 disposed under the privacy film 100.

The display panel 810 can display images using light incident by passing through the privacy film 100 after having generated from the backlight unit 820.

The display panel 810 can include first and second substrates 813 and 815 that are bonded by a sealant together with a liquid crystal layer interposed therebetween.

The first substrate 813 can include a plurality of pixels including a thin film transistor electrically connected to a gate line and a data line, a pixel electrode electrically connected to the thin film transistor, and a common electrode forming an electric field on the liquid crystal layer together with the pixel electrode.

The second substrate 815 can include a color filter overlapping with each pixel. Additionally, the color filter can be located on the first substrate 813 to overlap with pixel electrode of each pixel, and in this instance, the second substrate 815 can be used as a cover substrate.

A first polarizing plate 811 can be disposed on the top surface of the first substrate 813, and a second polarizing plate 817 can be disposed on the bottom surface of the second substrate 815. Here, a polarization axis of the first polarizing plate 811 and a polarization axis of the second polarizing plate 817 can be set in a direction intersecting each other.

Additionally, locations of the first and second substrates 813 and 815 can be reversed. That is, the second substrate 815 with the color filter can be disposed on the bottom surface of the first substrate 813 with a plurality of pixels. Thus, by driving a liquid crystal layer according to electric field formed in each pixel by a common voltage and a data voltage applied to each pixel, the display panel 810 can display certain color images according to the light transmittance of the liquid crystal layer.

The privacy film 100 disposed under the display panel 810 can be the privacy film as in FIGS. 1 and 2, a privacy film resulted from combining the structure of FIGS. 1 and 2 and the structure of FIG. 4, or a privacy film resulted from combining the structure of FIGS. 1 and 2 and the structure of FIG. 7.

The backlight unit 820 serves to emit light to the display panel 810, and can include a light guide plate 821, a light source 823, a reflective sheet 825, and an optical sheet 827.

The light guide plate 821 can be disposed under the display panel 810, and cause light entering through a light entering portion located on one side thereof to travel toward the rear surface of the display panel 810.

The light source 823 can serve to emit light to the light entering portion of the light guide plate 821. In one example, the light source 823 can include a package of light emitting diodes that is mounted on a printed circuit board for the light source, driven by a light-source-delivering signal provided from backlight driver, and emits light, such as white light.

Meanwhile, FIG. 8 illustrates that the light source 823 is located on one side of the light guide plate 821; however, embodiments of the present disclosure are not limited thereto. For example, the light source 823 can be located on the rear surface of the light guide plate 821. In this instance, the light guide plate 821 can be referred to as a diffusing plate.

The reflective sheet 825 is located under the light guide plate 821, and minimizes the loss of light by reflecting light entering after passing through the rear surface of the light guide plate 821 to the inside of the light guide plate 821.

The optical sheet 827 is located on the light guide plate 821, and can include a lower diffusion sheet, a prism sheet, and an upper diffusion sheet, but embodiments of the present disclosure are not limited thereto. For example, the optical sheet 827 can be formed from various combinations by stacking two or more of a diffusion sheet, a prism sheet, a dual brightness enhancement film, and a lenticular sheet.

The privacy film 100 can be disposed between the display panel 810 and the backlight unit 820, and control a viewing angle of the display panel 810 by blocking light entering at a predetermined angle or more from the backlight unit 820.

Specifically, when the display device 600 is driven, a voltage can be applied to the privacy film 100 too. Light provided from the backlight unit 820 can transmit a light collector, an adhesive layer and a light diffuser of the privacy film 100 sequentially, and then, travel toward the display panel 810.

Thus, the display device 800 using the privacy film 100 according to embodiments of the present disclosure can cause a viewing angle of the display device 800 to be reduced; thus, enable only a user to view images in the display device 800 by not allowing other people around the user of the display device 800 to view the images in the display device 800.

Hereinafter, with reference to FIGS. 9 and 10, discussions will be given on a difference in luminance between a display device according to one embodiment of the present disclosure and other display devices comparative examples.

Figure 9:
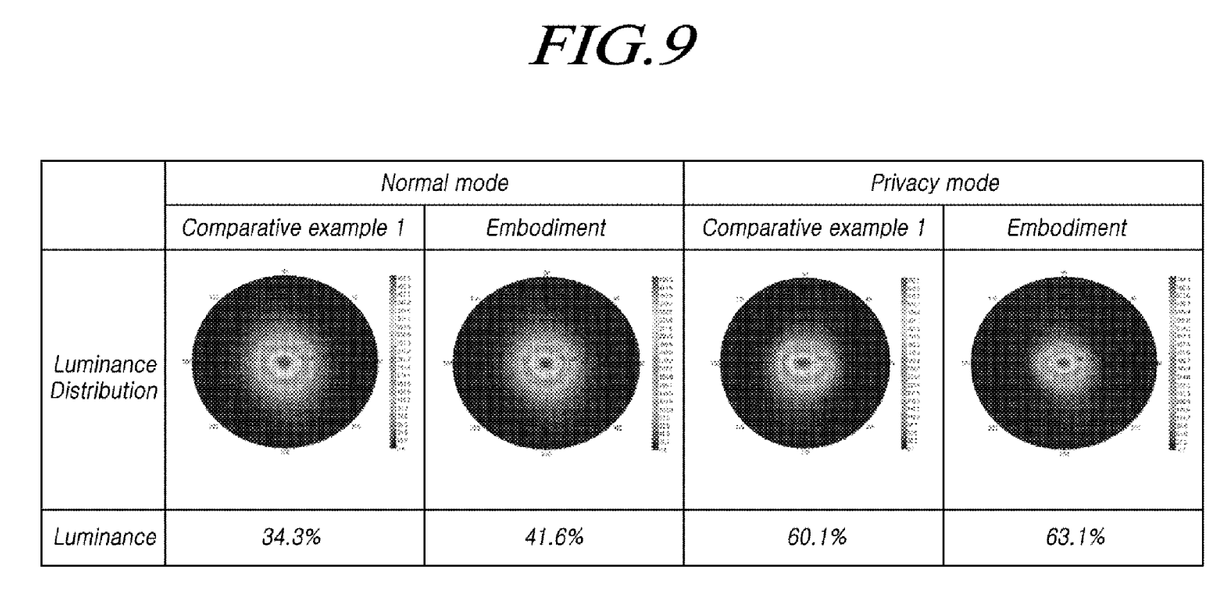
FIG. 9 illustrates a difference in luminance in a normal mode and a privacy mode between a display device according to Comparative example 1 and the display device according to Embodiments of the present disclosure.

FIG. 9 illustrates a difference in luminance in a normal mode and a privacy mode between a display device according to Comparative example 1 and the display device according to Embodiments of the present disclosure. FIG. 10 illustrates a difference in luminance in a normal mode and a privacy mode between a display device according to Comparative example 2 and the display devices according to Embodiment of the present disclosure.

In FIG. 9, it is assumed that the display device according to the Comparative example 1 includes a backlight unit, a privacy film and a display panel, and this privacy film includes an air gap instead of the adhesive layer 130 of the privacy film of FIGS. 1 and 2.

The display device according to the Embodiment includes a backlight unit, a privacy film, and a display panel, and this privacy film can be a film with a structure corresponding to the privacy film of FIGS. 1 and 2.

FIG. 9 shows that, in the normal mode, the luminance (41.6%) of the display device according to the Embodiment is higher than the luminance (34.3%) of the display device according to the Comparative example 1. Further, in even the privacy mode, the luminance (63.1%) of the display device according to the Embodiment is higher than the luminance (60.1%) of the display device according to the Comparative example 1.

Since the privacy film applied to the display device according to the Comparative example 1 has an air gap instead of the adhesive layer 130 of the privacy film of the present disclosure, some of light incident from the backlight unit is reflected; thus, cannot travel toward the display panel. Thus, the luminance of the display device according to the Comparative example 1 becomes lower than the luminance of the display device according to the Embodiment.

Specifically, a structure in which the air gap is provided instead of the adhesive layer 130 of the privacy film causes light exiting the backlight unit to reflect due to a difference in refractive indexes between the air gap and other one or more configurations (e.g., one or more configurations located an upper portion and a lower portion of the air gap); thus, a loss of the light occurs, and in turn, this causes the display device to display overall blurred images. In other words, the structure in which the air gap is provided instead of the adhesive layer 130 of the privacy film can cause quality of displayed images to be deteriorated.

Further, it is assumed that the display device according to the Comparative example 2 includes an adhesive layer 130 as in the privacy film of FIGS. 1 and 2 and to which a privacy film with a structure in which at least one first groove 135 not overlapping with a light blocking pattern 125 is applied.

Figure 10:
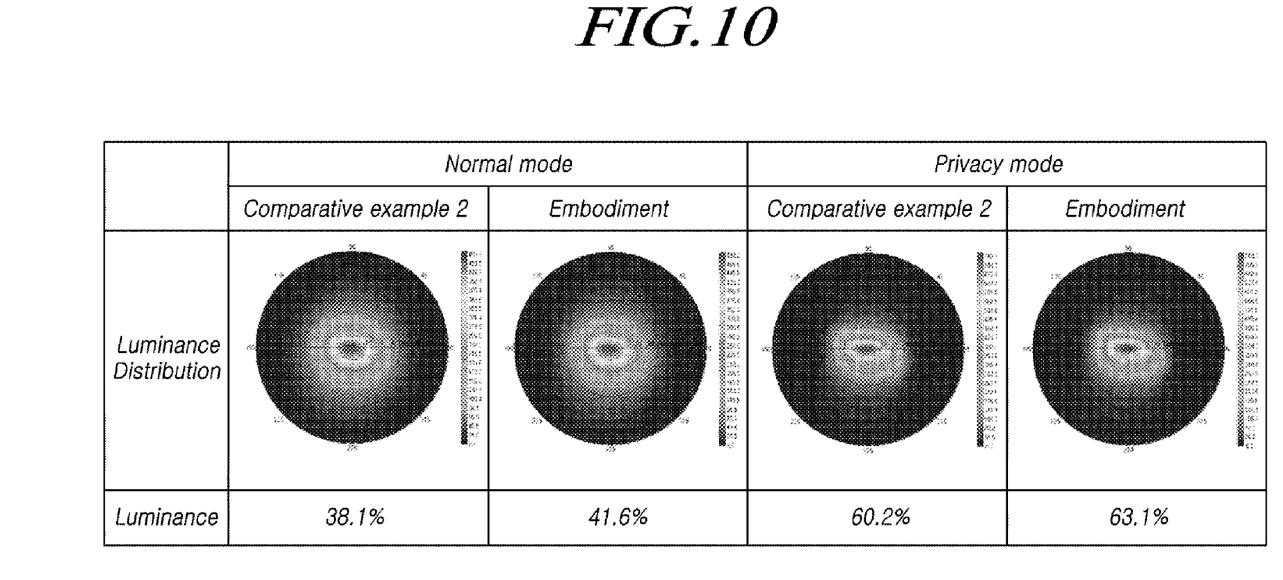
FIG. 10 illustrates a difference in luminance in a normal mode and a privacy mode between a display device according to Comparative example 2 and the display devices according to Embodiment of the present disclosure.

FIG. 10 shows that, in the normal mode, the luminance (41.6%) of the display device according to the Embodiment is higher than the luminance (38.1%) of the display device according to the Comparative example 2. Further, in even the privacy mode, the luminance (63.1%) of the display device according to the Embodiment is higher than the luminance (60.2%) of the display device according to the Comparative example 2.

In the privacy film applied to the display device according to the Comparative example 2, since the groove provided in the adhesive layer is disposed according to a direction in which light travels, an air layer located in the groove causes some of light to is be trapped in the privacy film. Thus, since some of light incident to the privacy film cannot travel toward the display panel, the luminance of the display device according to the Comparative example 2 becomes lower than the luminance of the display device according to the Embodiment.

As described above, in accordance with embodiments of the present disclosure, it is possible to provide a privacy film capable of easily being reworked and a display device including the privacy film, by providing an adhesive layer with at least one groove between a light collector and a light diffuser.

Further, in accordance with embodiments of the present disclosure, it is possible to provide a privacy film preventing light discharge efficiency of the privacy film from being degraded and a display device including the privacy film, by locating at least one groove of an adhesive layer in an area corresponding to a light blocking pattern.

Further, in accordance with embodiments of the present disclosure, it is possible to provide a privacy film with a reduced thickness and a display device including the privacy film, by providing an adhesive layer served as an upper substrate of a light collector.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A privacy film comprising:
a light collector including a plurality of first light blocking patterns disposed to be spaced apart from one another;
an adhesive layer disposed on the light collector and including at least one first groove in at least a part overlapping with the plurality of first light blocking patterns; and
a light diffuser disposed on the adhesive layer and including a plurality of capsules,
wherein the adhesive layer includes at least one second groove overlapping with the at least one first groove and located under the at least one first groove.

2. The privacy film according to claim 1, wherein the light collector comprises:
a first substrate;
a first light collecting layer disposed on the first substrate; and
the plurality of first light blocking patterns disposed in the first light collecting layer.

3. The privacy film according to claim 2, wherein one surface of the first light collecting layer and one surface of at least one of the plurality of first light blocking patterns contact the adhesive layer.

4. The privacy film according to claim 2, wherein the first light collecting layer includes a plurality of first accommodators spaced apart from one another, and at least one of the plurality of first light blocking patterns is disposed in at least one of the plurality of first accommodators.

5. The privacy film according to claim 4, wherein a height of the at least one of the plurality of first accommodators corresponds to a height of the at least one of the plurality of first light blocking patterns.

6. The privacy film according to claim 2, further comprising a second light collecting layer disposed on the first light collecting layer,
wherein the second light collecting layer includes a plurality of second accommodators spaced apart from one another, and at least one of a plurality of second light blocking patterns is disposed in at least one of the plurality of second accommodators.

7. The privacy film according to claim 6, wherein the plurality of second light blocking patterns extends in a direction intersecting a direction in which the plurality of first light blocking patterns extends, and
wherein the at least one first groove of the adhesive layer is located in an area in which the at least one of the plurality of first light blocking patterns and the at least one of the plurality of second light blocking patterns overlap with each other.

8. The privacy film according to claim 1, wherein at least one connection portion is disposed between the at least one first groove and the at least one second groove of adhesive layer, and
wherein the at least one connection portion overlaps with at least one of the plurality of first light blocking patterns.

9. The privacy film according to claim 1, wherein an air gap is located in the at least one first groove and the at least one second groove.

10. The privacy film according to claim 1, wherein widths of the at least one first groove and the at least one second groove are equal to or less than a maximum width of at least one of the plurality of first light blocking patterns.

11. The privacy film according to claim 1, wherein the light diffuser comprises:
a second substrate disposed on the adhesive layer;
a first electrode disposed on the second substrate;
a light diffusing layer disposed on the first electrode and including a plurality of capsules;
a second electrode disposed on the light diffusing layer; and
a third substrate disposed on the second electrode.

12. The privacy film according to claim 11, wherein the plurality of capsules includes a substrate and a plurality of particles included in the substrate,
wherein at least one of the plurality of particles is a molecule with an anisotropic permittivity and an anisotropic refractive index, and
wherein a refractive index of the at least one particle is different from a refractive index of the substrate when a voltage is not applied to the privacy film, and corresponds to the refractive index of the substrate when a voltage is applied to the privacy film.

13. The privacy film according to claim 11, wherein an amount of light scattered by the plurality of capsules is larger than an amount of light transmitting the light diffusing layer when a voltage is not applied to the privacy film, and the amount of light scattered by the plurality of capsules is smaller than the amount of light transmitting the light diffusing layer when a voltage is applied to the privacy film.

14. A display device comprising:
a display panel;
a backlight unit located under the display panel; and
a privacy film located between the display panel and the backlight unit,
wherein the privacy film comprises:
a light collector including a plurality of first light blocking patterns disposed to be spaced apart from one another;
an adhesive layer disposed on the light collector and including at least one first groove in at least a part overlapping the plurality of first light blocking patterns; and
a light diffuser disposed on the adhesive layer and including a plurality of capsules, and
wherein the adhesive layer includes at least one second groove overlapping with the at least one first groove and located under the at least one first groove.

15. The display device according to claim 14, wherein the light collector comprises:
a first substrate;
a first light collecting layer disposed on the first substrate; and
the plurality of first light blocking patterns disposed in the first light collecting layer.

16. The display device according to claim 14, wherein an air gap is located in the at least one first groove.

17. The display device according to claim 14, wherein a width of the at least one first groove is equal to or less than a maximum width of at least one of the plurality of first light blocking patterns.

18. The display device according to claim 14, wherein the light diffuser comprises:
a second substrate disposed on the adhesive layer;
a first electrode disposed on the second substrate;
a light diffusing layer disposed on the first electrode and including a plurality of capsules;
a second electrode disposed on the light diffusing layer; and
a third substrate disposed on the second electrode.

* * * * *